United States Patent
Chen et al.

[11] Patent Number: 5,989,144
[45] Date of Patent: Nov. 23, 1999

[54] OSCILLATORY ROLLER TRANSMISSION

[76] Inventors: Zhi Chen, 68 Xiao Wei Rd., Apt 152, Beijing 100005, China; Bo Chen, 163 Dutch Rd., East Brunswick, N.J. 08816; Shixian Chen, 68 Xiao Wei Rd., Apt. 152, Beijing 100005, China

[21] Appl. No.: 08/828,889

[22] Filed: Mar. 31, 1997

[30] Foreign Application Priority Data

Jul. 12, 1996 [CN] China .................................. 962155047

[51] Int. Cl.$^6$ ...................................................... F16H 1/32
[52] U.S. Cl. .......................... 475/168; 475/176; 475/346
[58] Field of Search ..................................... 475/162, 168, 475/1, 165, 176, 180, 183, 329, 346, 178, 179; 74/406, 465, 665 E, 63

[56] References Cited

U.S. PATENT DOCUMENTS

| | | | |
|---|---|---|---|
| 1,449,352 | 3/1923 | Seeck | 475/168 |
| 2,791,132 | 5/1957 | Wiczer | 74/63 |
| 3,468,175 | 9/1969 | Raber . | |
| 4,522,110 | 6/1985 | Samuelsson . | |
| 4,604,916 | 8/1986 | Distin, Jr. | 475/176 |
| 4,713,985 | 12/1987 | Ando . | |
| 4,736,654 | 4/1988 | Ren . | |
| 4,798,104 | 1/1989 | Chen . | |
| 4,856,378 | 8/1989 | Hvolka . | |
| 5,431,605 | 7/1995 | Ko . | |
| 5,695,425 | 12/1997 | Hashimoto et al. | 475/180 |

FOREIGN PATENT DOCUMENTS

| | | | |
|---|---|---|---|
| 86200768 U | 11/1986 | China . | |
| 85101702 | 4/1987 | China . | |
| 1020383 | 4/1993 | China . | |
| 314023 | 9/1971 | U.S.S.R. | 475/168 |
| 1307129 | 3/1987 | U.S.S.R. . | |
| 1307130 | 3/1987 | U.S.S.R. . | |
| 605156 | 7/1948 | United Kingdom | 475/168 |

OTHER PUBLICATIONS

Photo of a model for the design of present inventor Zhi Chen's patent CN 91101060.2 Referring to Fig. 10 of present application.

*Primary Examiner*—Rodney H. Bonck
*Assistant Examiner*—Sherry Lynn Estremsky

[57] ABSTRACT

A transmission apparatus comprising a wave actuator having a wave-actuating disk mounted on an eccentric body through a rolling bearing; an oscillatory roller gear having Zh number of oscillatory rollers assembled in Zh radial slots of an oscillatory roller carrier, and a stationary gear with Zg number of inner teeth, where Zg=Zh±1. The wave actuator pushes the oscillatory rollers to move radially. The oscillatory rollers roll along the inner surface of the stationary gear, driving the oscillatory roller carrier to rotate, thereby transmitting movement and power. Any one of the three components: the wave actuator, the oscillatory roller gear, and the stationary gear, can be chosen as a fixed component; the other two then form a speed-reducing or a speed-increasing transmission. When none of the components are fixed, they form a two-in/one-out differential transmission.

13 Claims, 9 Drawing Sheets

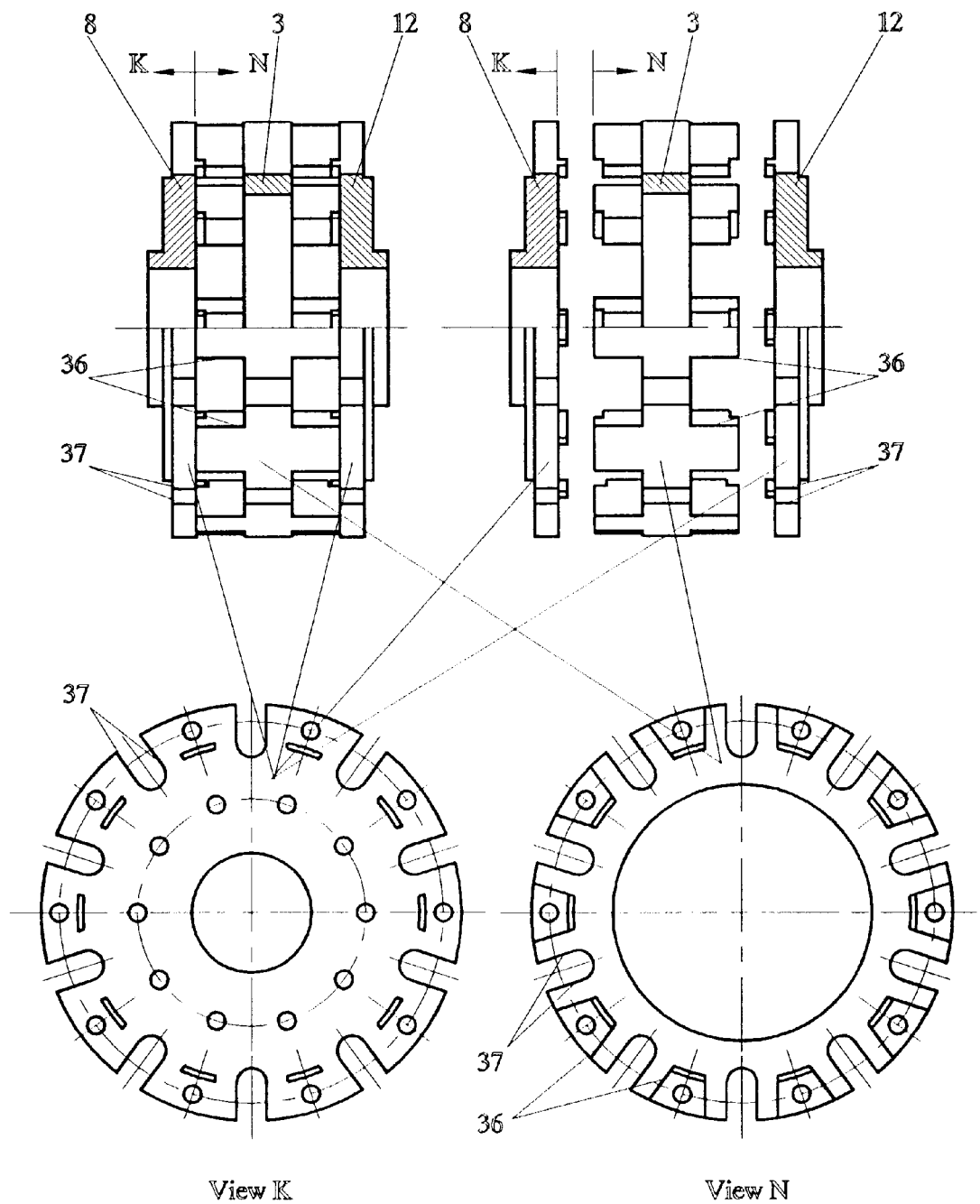

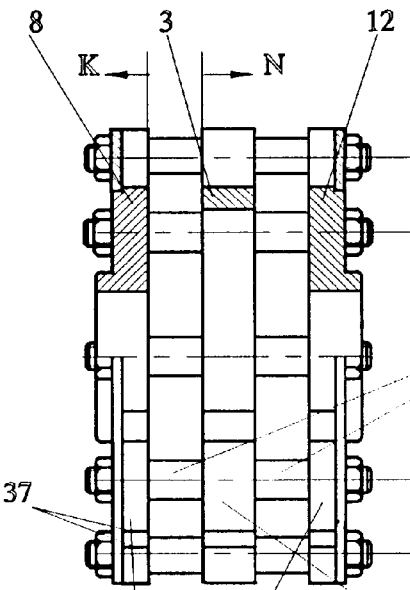
Fig. 6A
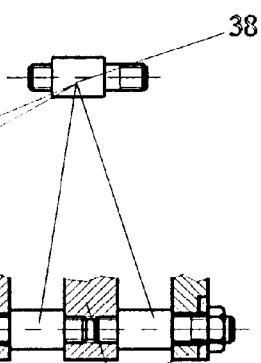
Fig. 6B
Fig. 6C
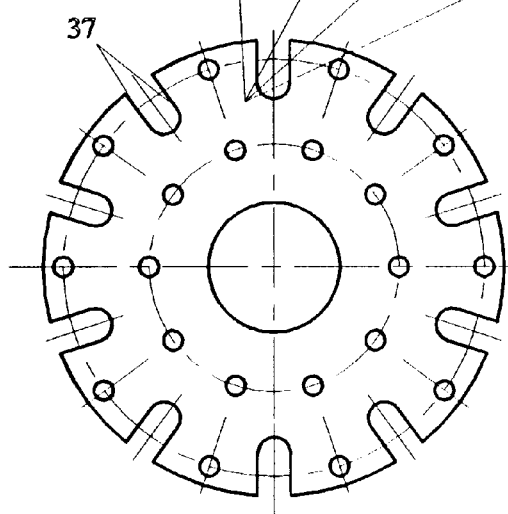
View K
Fig. 6D
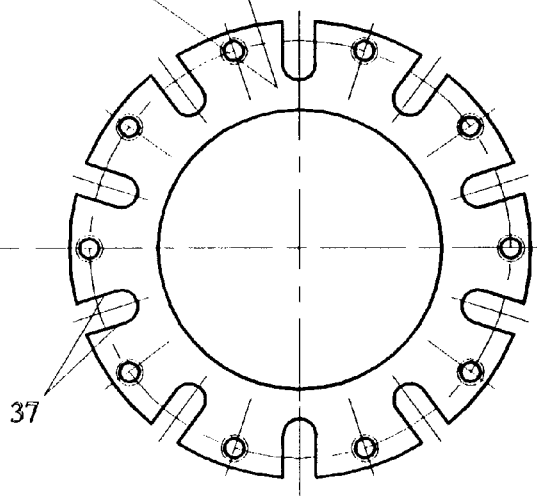
View N
Fig. 6E View K 3 View N

OSCILLATORY ROLLER TRANSMISSION

BACKGROUND OF THE INVENTION

1. Field of the Invention

This present invention relates to a transmission apparatus, more particularly, to a transmission apparatus that employs gears having movable gear teeth. This type of device can be used for a broad range of applications, which require motion and power to be transmitted continuously from an input element to an output element with a predetermined velocity ratio.

2. Description of the Related Art

There are known mechanical power transmission devices comprise gears having a plurality of movable gear teeth that mesh with stationary gears, such as U.S. Pat. No. 4,798,104, Chinese patent No.CN85,101,702A, Chinese patent No.CN86,200,768U, and Russian patent No.SU-1,307,129. Since sliding occurs between moving pairs among the wave generators, the movable gear teeth and their carriers, and the stationary gears, these types of devices have low transmission efficiency and high wear.

Sliding also occurs in the variable speed transmission apparatus of U.S. Pat. No. 4,856,378 because the rollers can only rotate with either the eccentric cam or the stationary gear but not both at the same time. This type of device has limited transmission ratios and loading capacity since the number of inner teeth of the stationary gear is two less than that of the rollers of the special gear, so that only a few gear teeth are engaged at any time. Furthermore, because the eccentricity of the extendable cam varies, the transmission ratio is not constant. Similarly, the loading capacity and transmission ratio of U.S. Pat. No. 3,468,175 are also limited because it requires the number of the movable gear teeth to be a harmonic of the number of the casing teeth. In addition, this design requires complicated movable gear teeth comprising five different rollers.

U.S. Pat. No. 4,713,985 provides a pure rolling-style transmission. However, the connecting elements on the carrier disk not only reduce the number of driving rollers but also increase their size. This type of transmission device has limited loading capacity because it has less engaged gear teeth. It also has limited transmission ratio because fewer driving rollers can be arranged on the carrier disk. Furthermore, the asymmetrical gear tooth profile of the casing and the structure of the connecting elements make this transmission suitable only for rotating in the pulling direction of the connecting elements.

In Chinese patent No.CN1,020,383C one of the present inventors Zhi Chen proposes an oscillatory tooth transmission which eliminates sliding from all relative moving pairs. As it is shown by FIG. 10, the oscillatory tooth gear comprises two gear tooth carriers, staggered at a half pitch of a gear tooth, and connected by a plurality of screws. Holding a row of oscillatory teeth, each gear tooth carrier comprises a force-transmitting disk 23 and an oscillatory tooth disk 22. This arrangement is difficult to produce and subject to assembly error. In addition, the oscillatory gear carrier has limited strength and stiffness.

SUMMARY OF THE INVENTION

Accordingly, the present invention has the following advantages and objectives: first, the relative movements among all components are of rolling style; second, there are many engaged gear teeth at any time; third, it has a high transmission ratio; fourth, the oscillatory roller gear can be easily produced and accurately assembled; thereby overcoming the inherent shortcomings of the prior arts. Further objects and advantages of our invention will become apparent from a consideration of the drawings and ensuing description.

Referring to FIGS. 1 and 2, the present invention is a transmission apparatus comprising three components: a wave actuator, an oscillatory roller gear, and a stationary gear. Said wave actuator comprises a wave-actuating disk 4 mounted on a rolling bearing 15 which is attached to an eccentric cam 1. Said oscillatory roller gear comprises Zh number of oscillatory rollers assembled in Zh radial roller slots 36 on the oscillatory roller carrier 31, where Zh=i, i is the transmission ratio. Each of the oscillatory rollers comprises a rolling ring 10 mounted on a rolling bearing 40 supported by an axle pin 11. Both ends of said axle pin rest in one of the Zh pin slots 37 of the oscillatory roller carrier. Said stationary gear 2 has Zg number of inner teeth, where Zg=Zh=1. Each inner tooth has a tooth profile of the envelope curve of the oscillatory rollers. Any one of the three components: the wave actuator, the oscillatory roller gear, and the stationary gear, may be chosen as a fixed component, the other two then form a speed-reducing or a speed-increasing transmission. If none of the components are fixed, they will form a two-in/one-out differential transmission.

When operating, each of the oscillatory rollers is in contact with three parts: the wave-actuating disk 4 of the wave actuator, the stationary gear 2, and the oscillatory roller carrier 31, forming three associated moving pairs. Take, for example, a speed reducer configuration in which the stationary gear is the fixed component: The wave actuator is connected to a high speed input shaft and the oscillatory roller carrier to a slow speed output shaft. Rotating with the input shaft, the wave actuator pushes the oscillatory rollers. The oscillatory rollers move radially while they are rolling along the inner surface of the stationary gear, driving the oscillatory roller carrier to rotate, thereby transmitting movement and power to the slow speed output shaft. Since the wave-actuating disk 4 is mounted on the eccentric cam 1 through the rolling bearing 15, the wave actuating disk can rotate freely with the oscillatory rollers. Furthermore, since the rolling ring 10 of the oscillatory roller is mounted on the axle pin 11 through the rolling bearing 40, the rolling ring and the axle pin are separated from each other, presenting two separate and freely rotating surfaces. The axle pin rests loosely in the pin slot 37 of the oscillatory roller carrier, so that the axle pin can roll radially on the surface of the pin slot. The roller slot 36 of the oscillatory roller carrier is wider than the diameter of the rolling ring 10, allowing the rolling ring to retract in the roller slot without contacting the oscillatory roller carrier. This arrangement separates the above-mentioned three associated moving pairs, such that each moving pair can rotate independently, achieving a rolling style of movement between each transmission pair.

Generally, the gear tooth profile of the stationary gear 2 is an envelope curve of the rolling ring 10, generated when the oscillatory roller, pushed by the wave actuator, moves radially while circling at a constant speed according to a transmission ratio i (See FIG. 3a). To improve the engaging in/out conditions between the rolling ring and the inner teeth of the stationary gear, the gear tooth profile of the stationary gear can be a corrected envelope curve of the oscillatory rollers (See FIG. 3b). Said corrected envelope curve is a curve such that the peak and valley of a gear tooth are trimmed 0.05~0.3 mm more than the theoretical envelope curve, and with a gradual transition to the theoretical envelope curve within 0–30° and 150–180° of the according 0–180° working range of the wave actuator. To simplify the manufacture process, the gear tooth profile of the stationary gear can also be an approximated envelope curve of the oscillatory rollers smoothed from three to five segments of circles (See FIG. 3c). Said circles should be decided by the radius of the curvature of three to five points on the theoretical envelope curve (i.e. ab, bc, cd of FIG. 3c).

The merits of this invention are:

A. High loading capacity and high shock overload tolerance:

The oscillatory roller transmission has more engaged teeth. In the present embodiment approximately 50% of the teeth are engaged at any time, achieving a loading capacity 5~6 times that of a similar sized conventional transmission. For the same reason, it also withstands high shock overload and eliminates catastrophic failure.

B. High efficiency, low heat generation, and low operation noise:

Within the moving mechanism of present invention all contacts are rolling contacts. It achieves a transmission efficiency of 90%–96% within its general range of transmission ratio. Rolling contacts also reduces the heat and noise generated during operation.

C. High transmission ratio and small size:

The transmission ratio of the present invention ranges from 4:1–60:1 for a single stage, and from 60:1–3600:1 for a double stage. For a similar power and transmission ratio, the size of the present invention may be ⅓ that of a conventional transmission and ½ that of a worm drive.

D. Simple structure and low production cost:

The present invention has simplified the structure of our previous design, particularly the construction of the oscillatory roller carrier. This new design makes it easier to produce and assemble accurately, reducing manufacturing costs.

(3a) is the envelope curve generated when the oscillatory roller, pushed by the wave actuator, moves radially, while rotating at a constant speed according to a transmission ratio i.

(3b) is the corrected envelope curve trimmed at the peak and bottom of a tooth.

(3c) is the approximated envelope curve smoothed from three segments of circle ab, bc, cd.

FIG. 4 shows the structure variations of the oscillatory roller of the present invention.

(4a) shows an oscillatory roller comprising a standard rolling bearing mounted on an axle pin.

(4b) shows an oscillatory roller comprising a rolling wheel mounted on a needle bearing which is supported by an axle pin.

(4c) shows an oscillatory roller comprising a rolling wheel supported by a sleeve, which is attached to an axle pin.

(4d) shows an oscillatory roller comprising a rolling wheel supported directly by an axle pin.

FIG. 5 shows the structures of the oscillatory roller carrier of the present invention.

(5a) shows an assembled oscillatory roller carrier.

(5b) shows the three major components of an oscillatory roller carrier: an oscillatory roller disk and two force-transmitting disks.

(5c) is the lateral view of the force-transmitting disk from direction K.

(5d) is the lateral view of the oscillatory roller disk from direction N.

FIG. 6 shows a variation of the structure of the oscillatory roller carrier of the present invention.

(6a) is the design of an oscillatory roller carrier in which the oscillatory roller disk and two force-transmitting disks assembled together through a plurality of rods.

(6b) shows a connecting rod.

(6c) shows the connections of the oscillatory roller disk and the force-transmitting disk.

(6d) is the lateral view of the force-transmitting disk from direction K.

(6e) is the lateral view of the oscillatory roller disk from direction N.

Figures 7A, 7B, 7C:
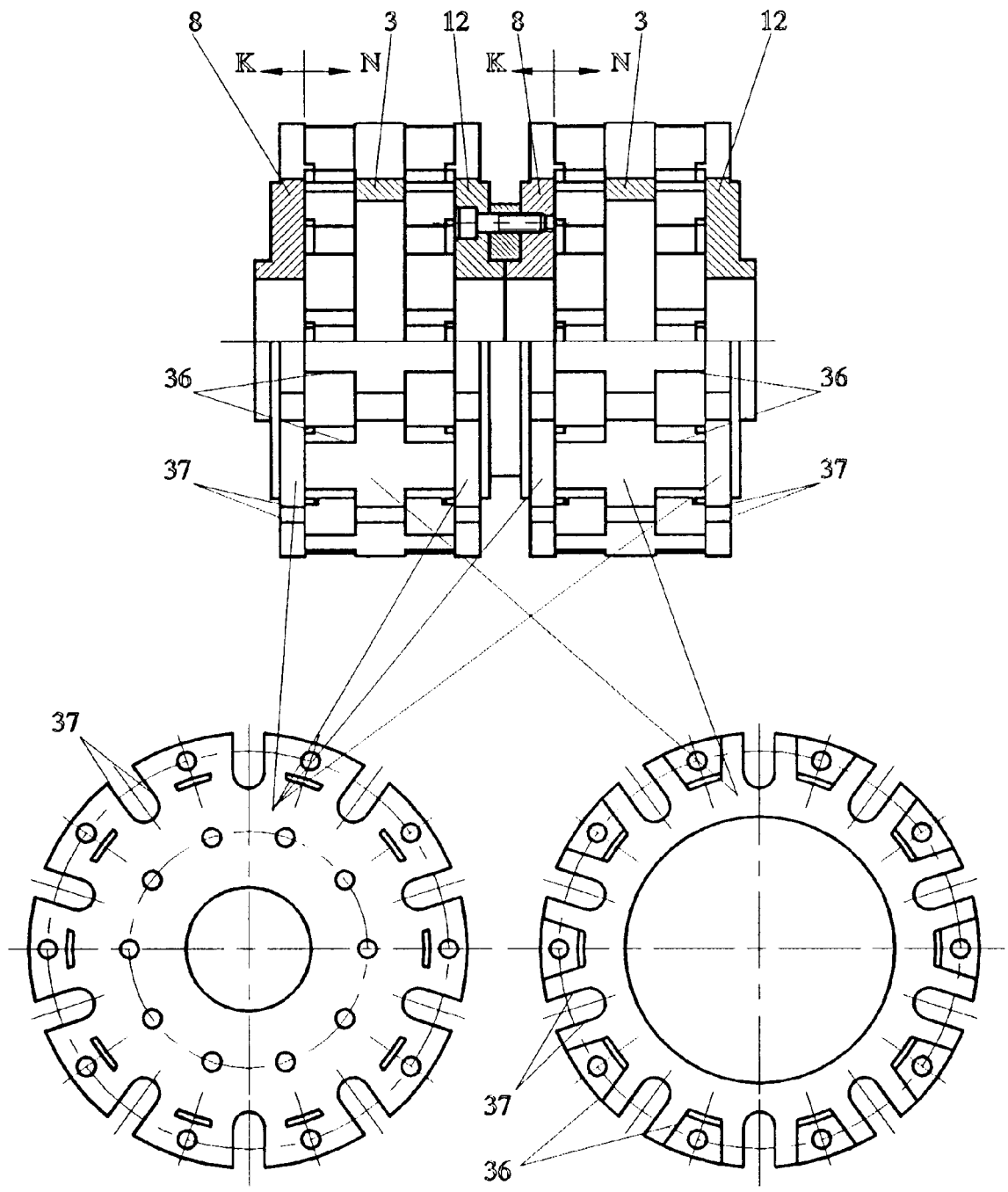

FIG. 7 shows a four-row configuration of an oscillatory roller carrier.

(7a) shows the assembled four-row design of an oscillatory roller carrier.

(7b) is the lateral view of the force-transmitting disk from direction K.

(7c) is the lateral view of the oscillatory roller disk from direction N.

Figure 8:
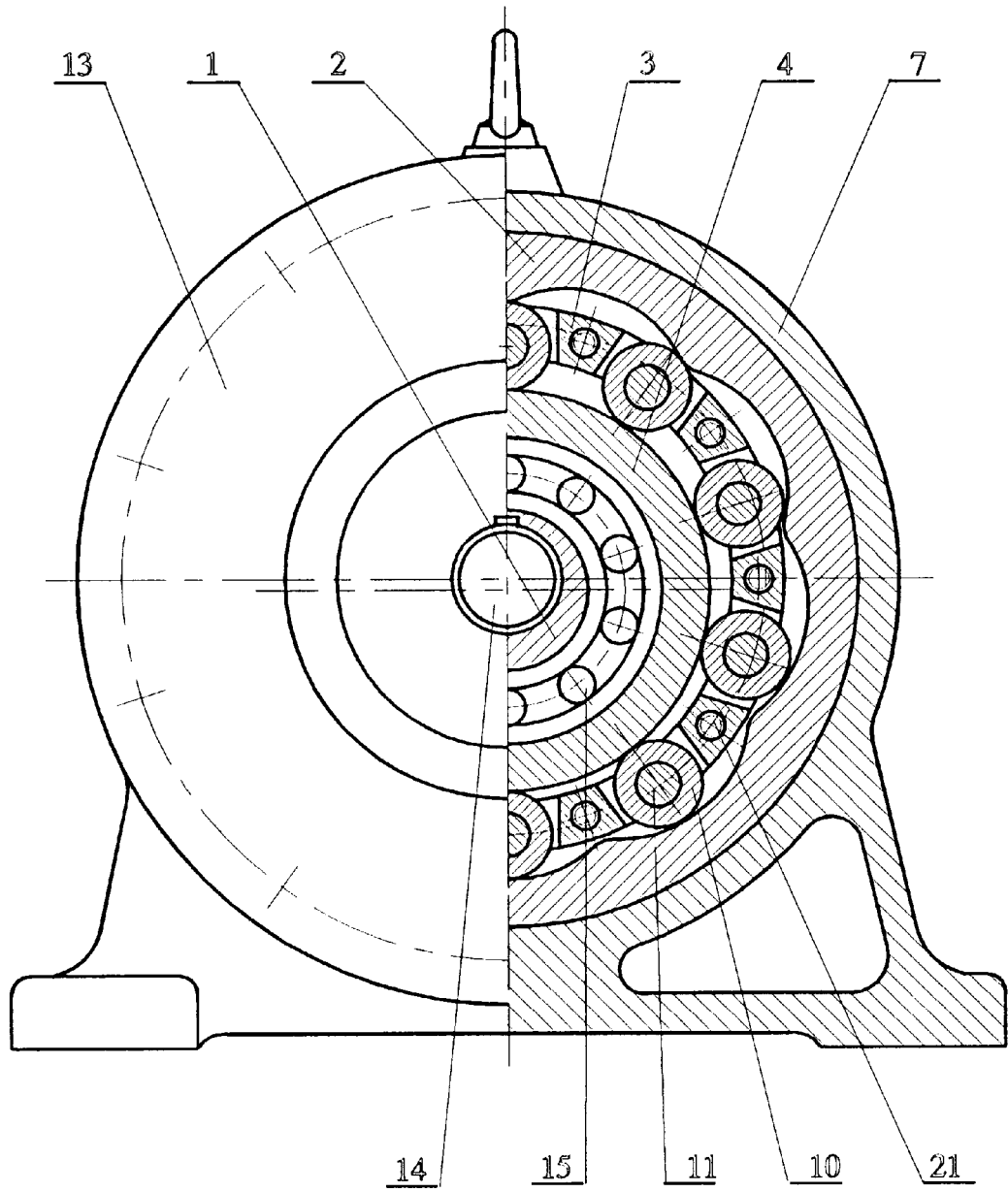

FIG. 8 is a transverse sectional view of an embodiment of the oscillatory roller transmission apparatus.

Figure 9:
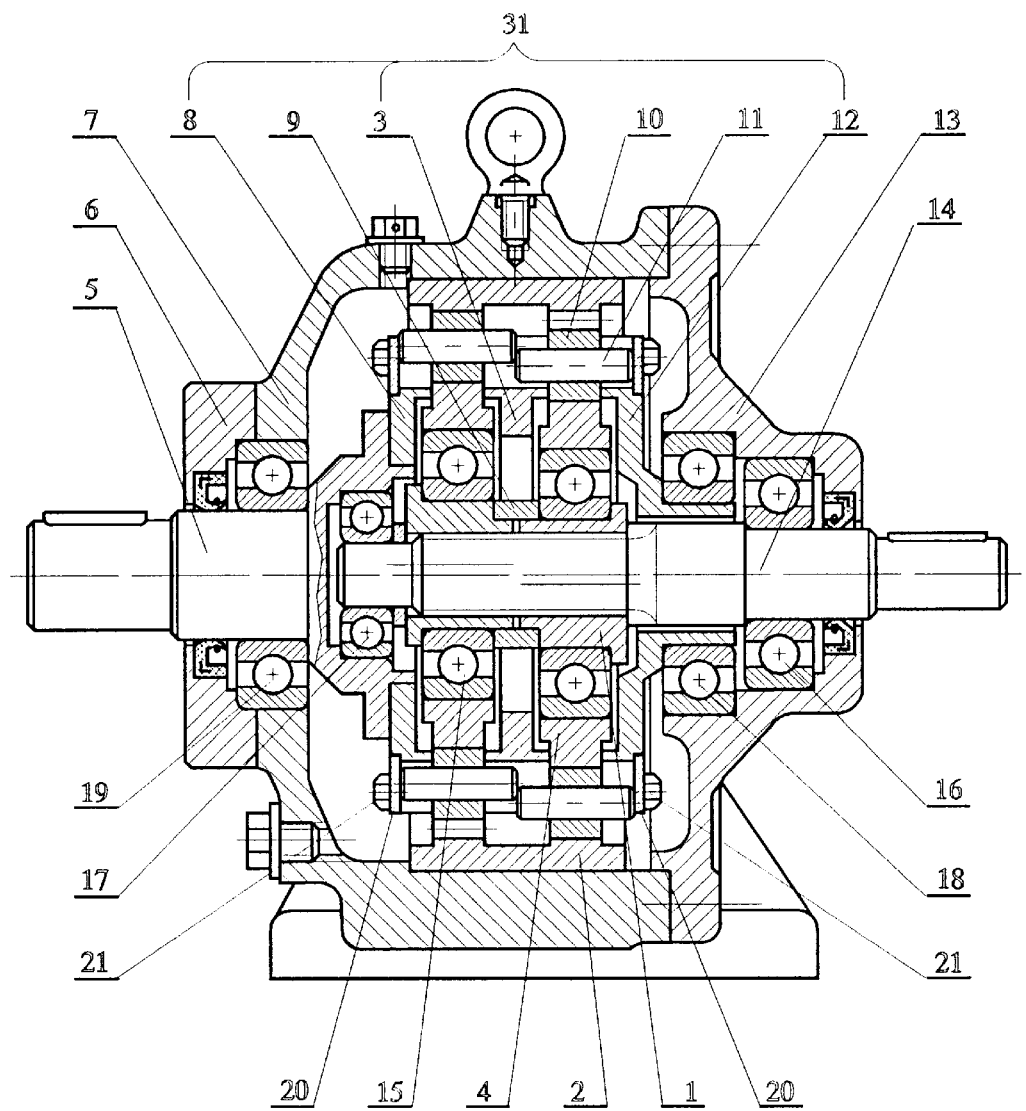

FIG. 9 is the cross-sectional view along the shaft of an embodiment of the oscillatory roller transmission apparatus.

Figure 10:
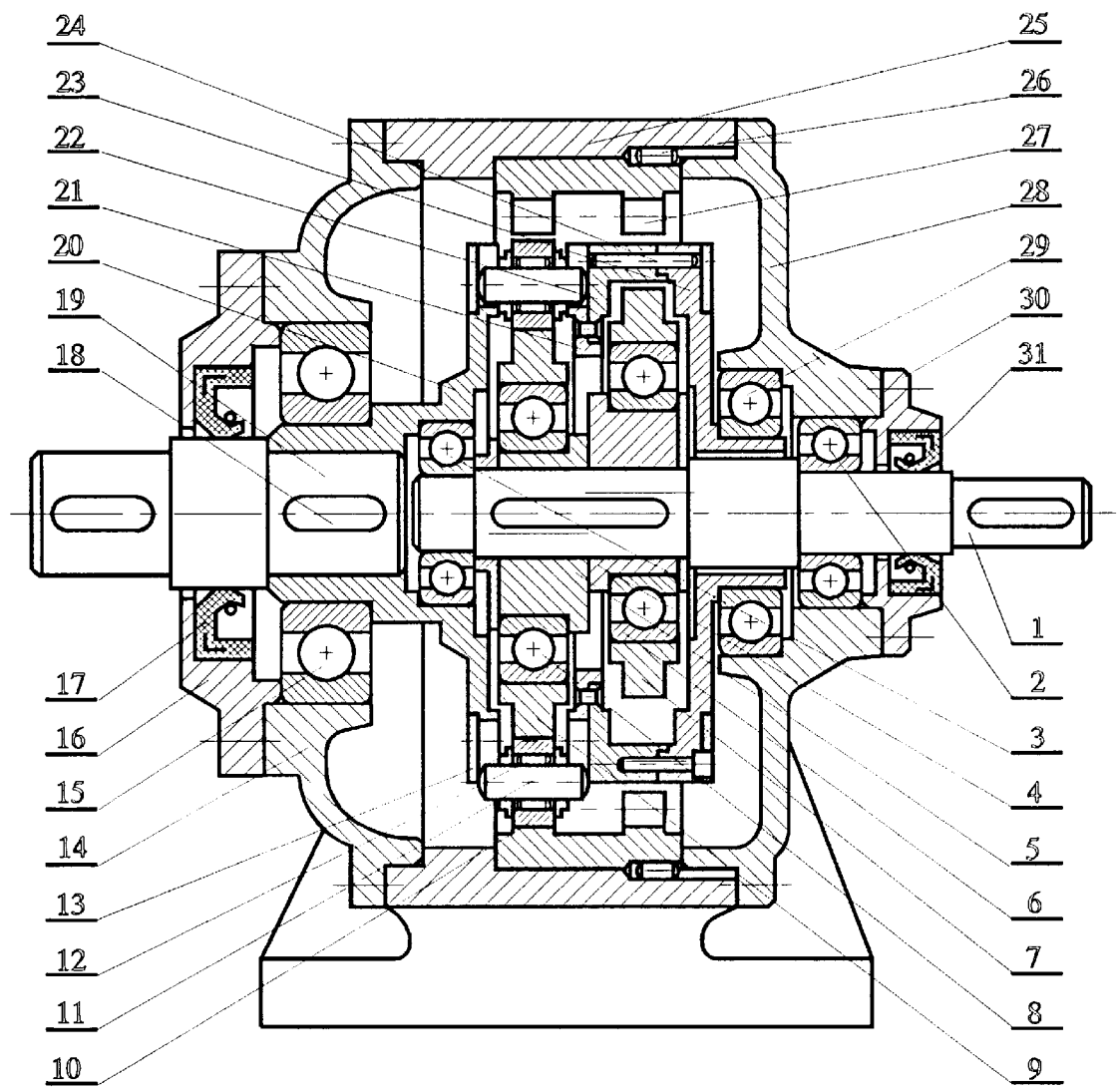

FIG. 10 is the cross-sectional view along the shaft of an embodiment of a prior art.

DETAILED DESCRIPTION OF THE PREFERRED EMBODIMENT

Referring to FIG. 8 and FIG. 9, the preferred embodiment of this invention is an oscillatory roller speed reducer in which Zg=Zh+1, transmission ratio i=+Zh. In other words, the low-speed output shaft 5 rotates in the same direction as the high-speed input shaft 14. A twin row arrangement is applied in order to increase the numbers of engaged gears and to form a symmetrical layout, thus keeping the internal loads balanced. Accordingly, this speed reducer comprises two wave actuators, an oscillatory roller gear, and a stationary gear. Rolling bearings 16 and 17 support the input shaft. The two wave actuators are mounted on the high-speed input shaft and positioned by ring 9. The peaks of the eccentric cams 1 of the two wave actuators are staggered 180° in phase. The oscillatory roller gear comprises an oscillatory roller carrier 31 and two rows of oscillatory rollers. The oscillatory roller carrier comprises an oscillatory roller disk 3 and two force-transmitting disks 8 and 12 connected altogether via screw 21. The two rows of oscillatory rollers are assembled in phase on the oscillatory roller carrier. The two wave actuators sit inside the oscillatory roller gear between the oscillatory roller disk and the force-transmitting disks, such that the wave-actuating disks 4 contact the oscillatory rollers. The stationary gear 2 has two rows of inner teeth. To match the positions of the wave actuators, the two rows of inner teeth are staggered at a half pitch of a gear tooth. Each row of the stationary gear has Zg number of inner teeth in mesh with the oscillatory rollers. The oscillatory roller carrier 31 is attached to the low speed shaft 5 through the force-transmitting disk 8 to form the output rotor of the speed reducer. The rolling bearing 18 on the large cover 13 and the rolling bearing 19 on the case 7 support the output rotor. The small cover 6 fixed the output rotor axially.

Referring to FIG. 5, the oscillatory roller carrier 31 comprises an oscillatory roller disk 3 and two force-transmitting disks 8 and 12. The oscillatory roller disk has Zh number of radial roller slots 36 and Zh number of radial pin slots 37 at both ends. The roller slots at the opposite ends of the oscillatory roller disk are in phase and the pin slot is in the center of the roller slot. The force-transmitting disks also have Zh number of radial pin slots. The two force-transmitting disks are assembled at the ends of the oscillatory roller disk 3. The pin slots on the oscillatory roller disk align with the pin slots on the force-transmitting disks, such that both ends of the axle pin 11 of the oscillatory roller rest in the radial pin slots. FIG. 6 shows the design in which the oscillatory roller carrier 31 comprises an oscillatory roller disk 3, and two force-transmitting disks 8 and 12. The force-transmitting disks are assembled at both ends of the oscillatory roller disk through a plurality of rods 38. Both the oscillatory roller disk and the force-transmitting disks have radial pin slots 37. The pin slots on the oscillatory roller disk align with the pin slots on the force-transmitting disks, so that the gaps between pairs of rods form the oscillatory roller slots.

Each wave actuator comprises an eccentric cam 1, a rolling bearing 15, and a wave-actuating disk 4. Obviously, the wave actuator can also be just a rolling bearing mounted on an eccentric cam. Each oscillatory roller comprises a rolling ring 10 supported by an axle pin 11, allowing the rolling ring to rotate freely on the axle pin. The gear tooth profile of the stationary gear 2 is the corrected envelope curve of the rolling ring generated when the oscillatory roller moves radially, while circling at a constant speed according to transmission ratio i. When the eccentric cam 1 rotates clockwise, it pushes the rolling ring 10 to move radially through the wave-actuating disk 4. The rolling ring engages with the stationary gear 2 and rolls along the surface of the stationary gear, so that the rolling ring circles clockwise while moving radially. Both ends of the axle pin 11 of each oscillatory roller rest loosely in the pin slot 37, so that the axle pin can roll radially on the side surfaces of the pin slot. The plates 20 on the force-transmitting disks decide the axial position of the axle pins. The roller slot 36 on the oscillatory roller carrier is wider than the diameter of the rolling ring 10, permitting the rolling ring to retract in the roller slot without contacting the oscillatory roller carrier. The axle pin transmits the circumferential movement and force of the rolling ring to the oscillatory roller carrier. Since the rolling ring rotates freely on the pin, the movements of the oscillatory rollers are of pure rolling style.

When the peak of the wave-actuating disk 4 engages with the rolling ring 10, and the rolling ring is at a tooth valley of the stationary gear 2, the instantaneous radial movement and circumferential force of the rolling ring are zero. When the peak of the wave-actuating disk 4 has passed the rolling ring 10, the circumferential movement of the oscillatory roller carrier 31 transmits to the axle pin 11, and thereafter to the rolling ring through the back wall of the pin slot 37. The rolling ring rolls along the inner surface of the stationary gear, generating a radial force that pushes the axle pin to roll along the surface of the pin slot, thereby retracting the oscillatory roller in the roller slot 36. When the lowest point of the wave-actuating disk 4 engages with the rolling ring 10, the inward radial movement of the oscillatory roller reaches its limit and retraction stops. The rolling ring will then be ready to engage with the next tooth of the stationary gear to start another working cycle. Among the Zh oscillatory rollers, half of them are in working cycle ahead of the peak of the wave-actuating disk, while the other half are in retracting cycle. The movements of the oscillatory rollers during both working and retracting cycles are of pure rolling style.

There are various designs to further increase the loading capacity of the speed reducer for applications requiring high power and compact structure, such as oil drilling and pumping. The gears of the speed reducer can be arranged in n rows, where n is an integer greater than two. To keep the internal force in balance, the peaks of the eccentric cams of the n wave actuators are staggered evenly or symmetrically in phase, while the n rows inner teeth of the stationary gear matching the distribution of the wave actuators. For example, FIG. 7 shows a four-row design of an oscillatory roller carrier. In one arrangement, the peaks of the 4 wave actuators are 360°/4 in phase while the 4 rows of inner teeth of the stationary gear are staggered ¼ pitch of a gear tooth. Another arrangement involves placing two pairs of the 4 wave actuators 180° in phase, and accordingly the inner teeth of the stationary gear are staggered a half pitch of a gear tooth.

Figure 2:
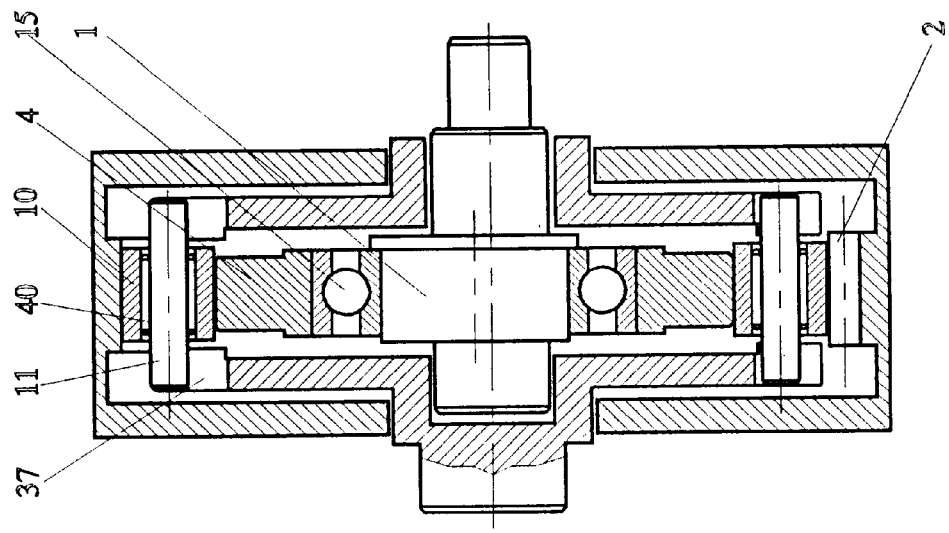
FIG. 2 is a cross-sectional view along the shaft of the oscillatory roller transmission apparatus.
Figure 1:
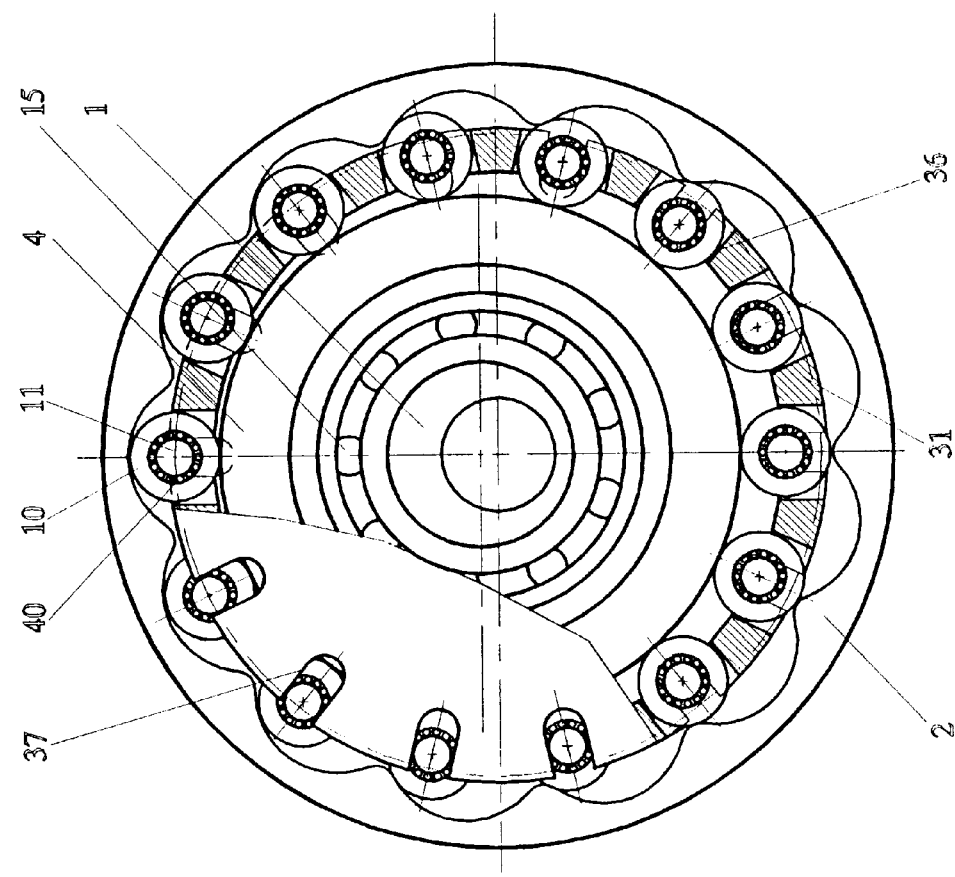
FIG. 1 is a transverse sectional view, partially broken away, of the oscillatory roller transmission apparatus.
Figure 3A:
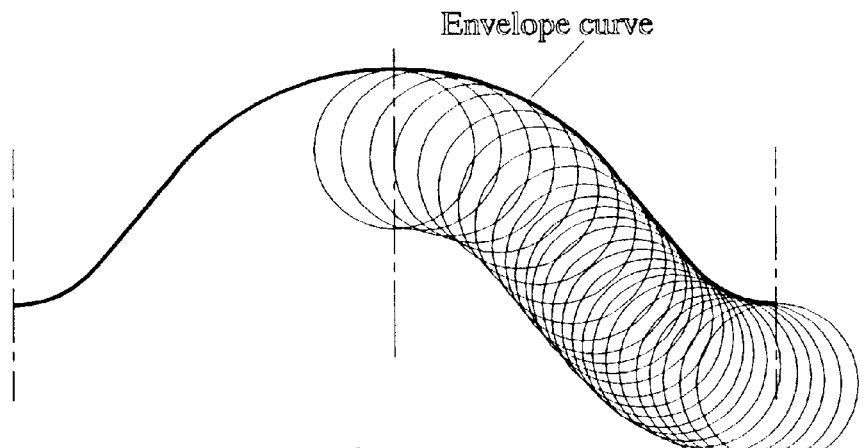
FIG. 3 shows the tooth profile of the inner teeth of the stationary gear.
Figure 3B:
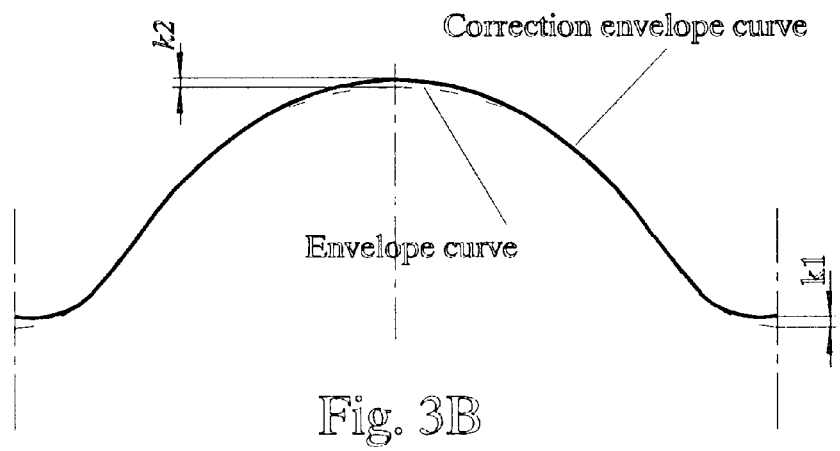
Figure 3C:
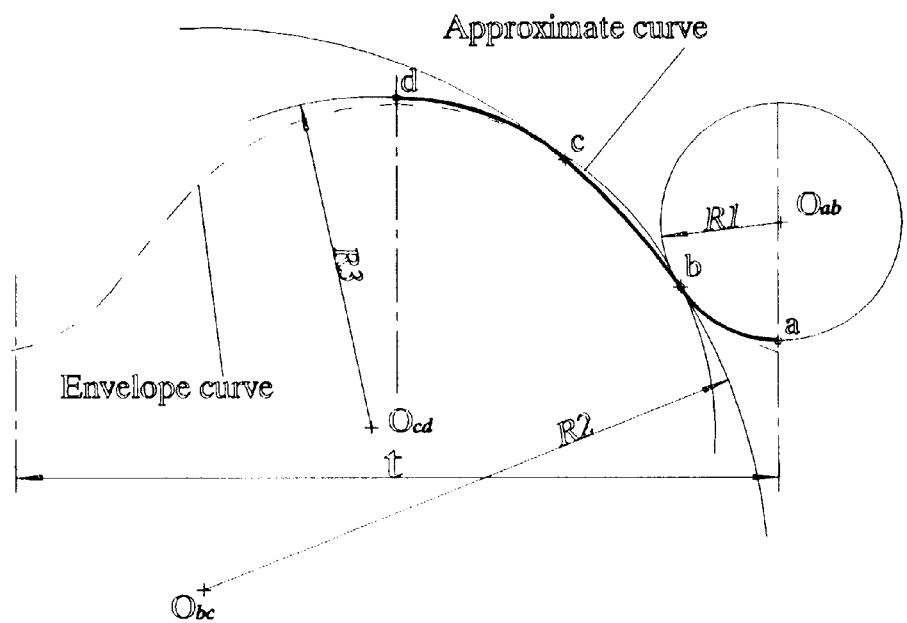
Figure 4A:
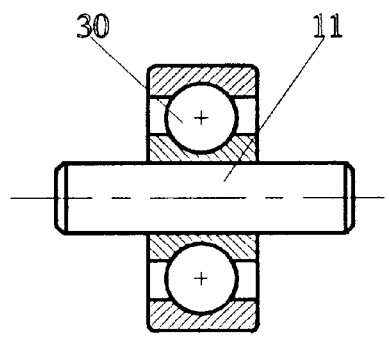
Figure 4B:
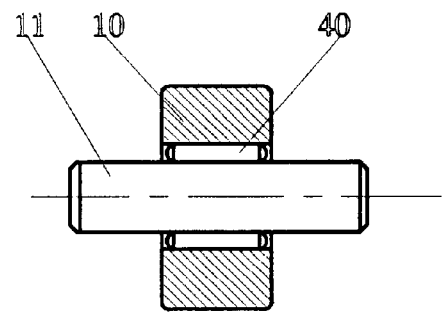
Figure 4C:
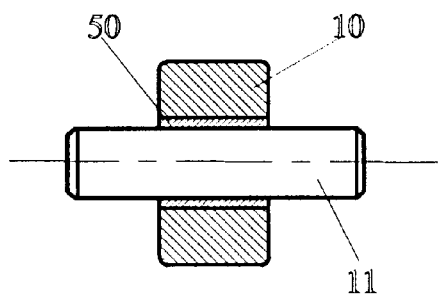
Figure 4D:
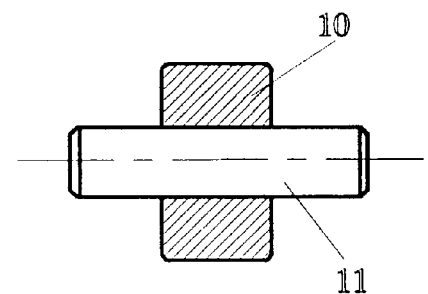

There can be several variations in the structure of the oscillatory rollers to produce speed reducers of various sizes and transmission ratios. For speed reducers of large size or small transmission ratio, the oscillatory roller can be a standard rolling bearing 30 supported on an axle pin 11 (See FIG. 4a). For speed reducers of medium size or transmission ratio, the oscillatory roller can be a roller ring 10 mounted on an axle pin 11 via the rolling pin 40 (FIG. 4b). For speed reducers of small size or large transmission ratio, the roller ring 10 can be mounted on the axle pin 11 via the sleeve 50 (FIG. 4c), or the roller ring 10 may be directly supported by the axle pin 11 (FIG. 4d).

We claim:

1. A transmission apparatus comprising:

(a) an oscillatory roller gear;

said oscillatory roller gear comprising two rows of oscillatory rollers and an oscillatory roller carrier;

said oscillatory rollers each comprising rolling means and an axle pin; said rolling means being supported on said axle pin;

said oscillatory roller carrier comprising an oscillatory roller disk and two force-transmitting disks;

said oscillatory roller disk having Zh number of radial roller slots at both ends and Zh number of radial pin slots;

said roller slots at the opposite ends of the oscillatory roller disk being in phase, and said pin slots being centered with the roller slots; the roller slots being wider than the diameter of the rolling means, allowing the rolling means to retract in the roller slots;

said force-transmitting disk also having Zh number of radial pin slots;

the two force-transmitting disks being assembled at the ends of the oscillatory roller disk; the radial pin slots on the oscillatory roller disk aligning with the radial pin slots on the force-transmitting disks; both ends of the axle pins of the oscillatory rollers resting in the radial pin slots and being able to rotate along the side surfaces of the radial pin slots;

(b) a stationary gear;

said stationary gear having two rows of inner teeth, each row having Zg number of inner teeth, in which $Zg = Zh \pm 1$;

said two rows of inner teeth being staggered at a half a pitch of a gear tooth;

said inner teeth having a gear tooth profile of the envelop curve of the oscillatory rollers, whereby the inner teeth of the stationary gear are in mesh with the oscillatory rollers;

(c) two wave actuators;

said wave actuators each comprising a wave-actuating disk, a rolling means and an eccentric body;

said wave-actuating disk being mounted on said eccentric body through said rolling means;

the two wave actuators sitting in the oscillatory roller gear between the oscillatory roller disk and the force-transmitting disks; the peaks of the two eccentric bodies being staggered 180° in phase, the wave-actuating disks contacting the oscillatory rollers;

rotation of said wave actuators pushing said oscillatory rollers to move radially and to roll along the inner surface of said stationary gear, driving said oscillatory roller carrier to rotate, whereby transmitting movement and power according to a predetermined ratio.

2. The transmission apparatus of claim 1, wherein said oscillatory roller carrier further comprises a plurality of rods; the force-transmitting disks being assembled at both ends of the oscillatory roller disk through said plurality of rods; gaps between pairs of the rods forming the Zh number of roller slots, with the pin slots of both the oscillatory roller disk and the force-transmitting disks being aligned to the center of said roller slots.

3. The transmission apparatus of claim 1, wherein the roller means of each of said oscillatory rollers comprises a rolling ring and a rolling bearing, said rolling ring being mounted on said rolling bearing supported by said axle pin.

4. The transmission apparatus of claim 1, wherein the roller means of each of said oscillatory rollers comprises a rolling bearing and, said rolling bearing being supported by said axle pin.

5. The transmission apparatus of claim 1, wherein the roller means of each of said oscillatory rollers comprises a rolling ring and a sleeve, said rolling ring being mounted on said sleeve supported by said axle pin.

6. The transmission apparatus of claim 1, wherein the roller means of each of said oscillatory rollers comprises a rolling ring, said rolling ring being supported by said axle pin.

7. The transmission apparatus of claim 1, wherein the rolling means of each of said wave actuators comprises a rolling bearing, said rolling bearing being mounted on said eccentric body.

8. The transmission apparatus of claim 1, wherein said stationary gear has a gear tooth profile of a corrected envelope curve of said oscillatory roller; said corrected envelope curve is a curve for which a peak and a valley of each stationary gear tooth are trimmed according to a predetermined value, and with gradual transition to said envelope curve within a predetermined angle.

9. The transmission apparatus of claim 1, wherein said stationary gear has a gear tooth profile of an approximated envelope curve of said oscillatory roller; said approximated envelope curve is a curve smoothed from segments of circles, said circles being decided by the radius of curvature of predetermined points on said envelope curve.

10. The transmission apparatus of claim 1, wherein one of the three components: said wave actuators, said oscillatory roller gear, and said stationary gear, is a fixed component, the other two then form a speed-reducing or a speed-increasing transmission.

11. The transmission apparatus of claim 1, wherein the three components: said wave actuators, said oscillatory roller gear, and said stationary gear form a two-in/one-out differential transmission.

12. The transmission apparatus of claim 1, wherein said oscillatory rollers, said inner teeth of said stationary gear and said wave actuators are arranged in more than two rows; the peaks of the eccentric bodies of said wave actuators are staggered evenly in phase, with the rows of inner teeth of the stationary gear matching the position of the wave actuators.

13. The transmission apparatus of claim 12, wherein the peaks of the eccentric bodies of said wave actuators are staggered symmetrically in phase, with the rows of inner teeth of said stationary gear matching the position of the wave actuators.

* * * * *